United States Patent
Suleiman et al.

(10) Patent No.: US 10,373,065 B2
(45) Date of Patent: Aug. 6, 2019

(54) GENERATING DATABASE CLUSTER HEALTH ALERTS USING MACHINE LEARNING

(71) Applicant: Oracle International Corporation, Redwood Shores, CA (US)

(72) Inventors: Yaser I. Suleiman, Santa Clara, CA (US); Michael Zoll, Foster City, CA (US); Angelo Pruscino, Los Altos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 130 days.

(21) Appl. No.: 13/791,669

(22) Filed: Mar. 8, 2013

(65) Prior Publication Data

US 2014/0258187 A1 Sep. 11, 2014

(51) Int. Cl.
G06F 11/00 (2006.01)
G06N 20/00 (2019.01)

(52) U.S. Cl.
CPC ............ *G06N 20/00* (2019.01); *G06F 11/00* (2013.01)

(58) Field of Classification Search
CPC ...... G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS

| | | | |
|---|---|---|---|
| 7,509,336 B2 | 3/2009 | Buckler | |
| 7,542,998 B1* | 6/2009 | Lavie | G06F 17/30306 |
| 8,200,525 B2* | 6/2012 | Kilger | G06Q 30/02 |
| | | | 705/7.31 |
| 8,719,190 B2* | 5/2014 | El-Rafei | G06F 11/0715 |
| | | | 706/12 |
| 2003/0158795 A1 | 8/2003 | Markham | |
| 2003/0188189 A1* | 10/2003 | Desai | H04L 63/145 |
| | | | 726/23 |

(Continued)

OTHER PUBLICATIONS

Zhang, Jian; Learning-Aided System Performance Modeling in Support of Self-Optimized Resource Scheduling in Distributed Environments; 2007; University of Florida; http://ufdc.ufl.edu/UFE0021738/00001/pdf.*

(Continued)

*Primary Examiner* — Scott A. Waldron
*Assistant Examiner* — Viker A Lamardo
(74) *Attorney, Agent, or Firm* — Vista IP Law Group, LLP

(57) ABSTRACT

A method, system, and computer program product for generating database cluster health alerts using machine learning. A first database cluster known to be operating normally is measured and modeled using machine learning techniques. A second database cluster is measured and compared to the learned model. More specifically, the method collects a first set of empirically-measured variables of a first database cluster, and using the first set of empirically-measured variables a mathematical behavior predictor model is generated. Then, after collecting a second set of empirically-measured variables of a second database cluster over a plurality of second time periods, the mathematical behavior predictor model classifies the observed behavior. The classified behavior might be deemed to be normal behavior, or some form of abnormal behavior. The method forms and report alerts when the classification deemed to be anomalous behavior, or fault behavior. A Bayesian belief network predicts the likelihood of continued anomalous behavior.

17 Claims, 10 Drawing Sheets

(56) References Cited

U.S. PATENT DOCUMENTS

| | | | |
|---|---|---|---|
| 2004/0024773 A1 | 2/2004 | Stoffel | |
| 2004/0236604 A1* | 11/2004 | McNair | G06F 19/3493 |
| | | | 705/2 |
| 2006/0004839 A1 | 1/2006 | Nagasawa | |
| 2006/0074970 A1* | 4/2006 | Narayanan | G06F 11/3419 |
| 2009/0089869 A1* | 4/2009 | Varghese | G06F 21/31 |
| | | | 726/7 |
| 2012/0022700 A1* | 1/2012 | Drees | G05B 15/02 |
| | | | 700/276 |
| 2012/0066204 A1 | 3/2012 | Ball | |
| 2012/0117009 A1* | 5/2012 | Dutt | G06N 7/005 |
| | | | 706/12 |
| 2012/0117226 A1 | 5/2012 | Tanaka et al. | |
| 2012/0254669 A1* | 10/2012 | Xia | G06F 11/004 |
| | | | 714/47.2 |
| 2012/0283991 A1* | 11/2012 | Oliner | G06F 11/0751 |
| | | | 702/186 |
| 2012/0303619 A1 | 11/2012 | Fisera | |
| 2012/0317274 A1 | 12/2012 | Richter | |
| 2014/0201120 A1* | 7/2014 | Lydon | G06F 21/316 |
| | | | 706/46 |
| 2014/0258254 A1 | 9/2014 | Suleiman | |

OTHER PUBLICATIONS

Non-final Office Action dated Nov. 6, 2015 for related U.S. Appl. No. 13/791,651.

Final Office Action dated May 12, 2015 for U.S. Appl. No. 13/791,651.

Non-Final Office Action dated Dec. 18, 2014 in U.S. Appl. No. 13/791,651, filed Mar. 8, 2013, inventor: Yaser Ib Suleiman (13 pages).

Notice of Allowance and Fee(s) due dated Apr. 20, 2016 for related U.S. Appl. No. 13/791,651.

\* cited by examiner

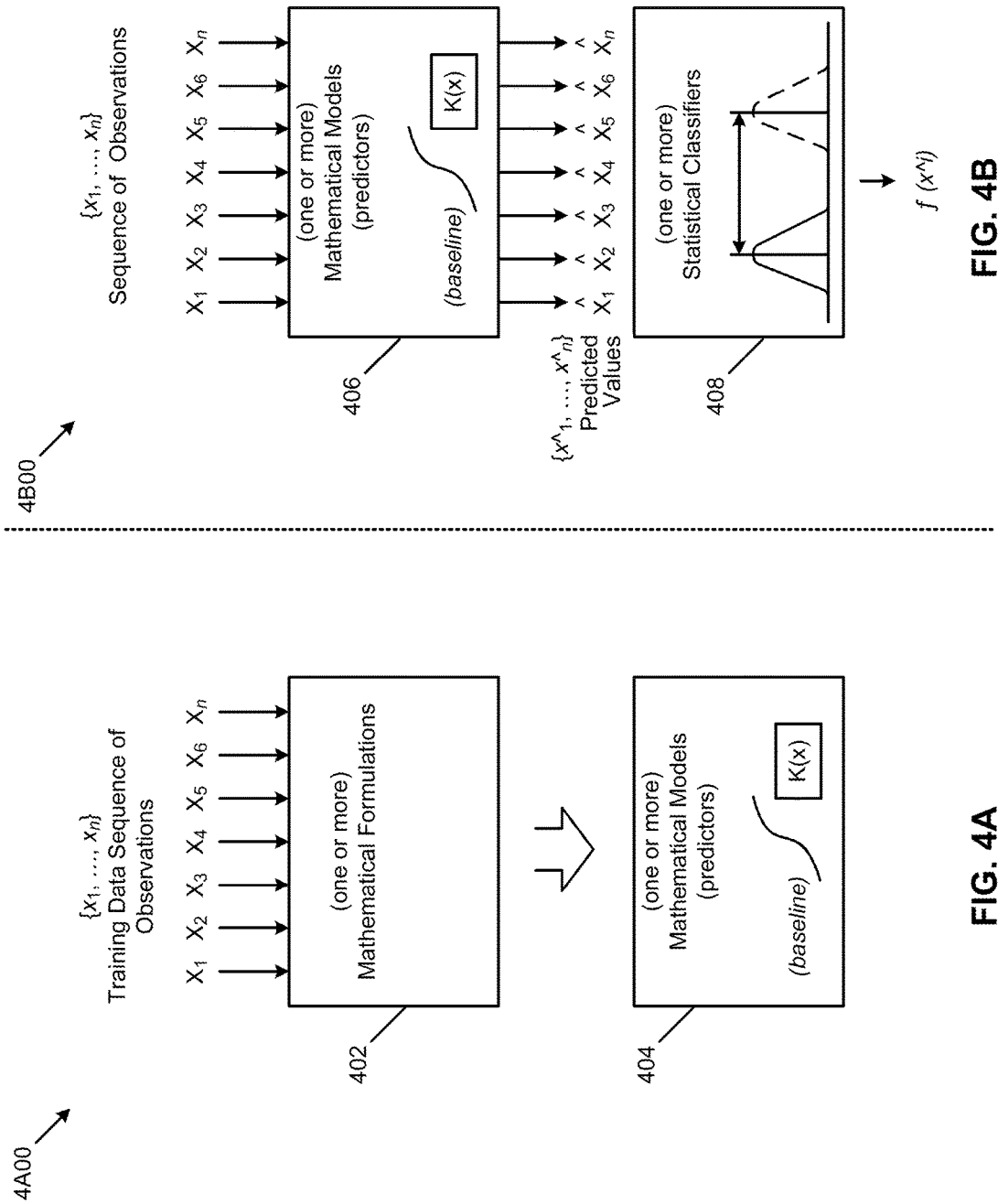

GENERATING DATABASE CLUSTER HEALTH ALERTS USING MACHINE LEARNING

RELATED APPLICATIONS

The present application is related to co-pending U.S. patent application Ser. No. 13/791,651, entitled "ANALYZING DATABASE CLUSTER BEHAVIOR BY TRANSFORMING DISCRETE TIME SERIES MEASUREMENTS", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of database cluster environments and more particularly to techniques for generating database cluster health alerts using machine learning.

BACKGROUND

Database clusters are becoming increasingly larger and more complex. The horizontal expansion of computing component resources (e.g., more and more computing nodes, more and more storage-oriented devices, more and more communication paths between components, more and more processes, etc.) coupled with the proliferation of high-performance component instrumentation results in systems capable of generating extremely high bandwidth streams of sensed data. Even a session of very short duration to capture such sensed data can result in an accumulation of correspondingly large volumes of raw data which—even just considering the sheer volume—presents a huge challenge to system administrators to perceive the meaning within the volume of data.

Yet, within the raw data are measurements that can be used to determine the current health state of the measured system. In some cases the raw measurements can be used to predict a future health state (e.g., upcoming problem) of the measured system.

Legacy measurements have often included performance metrics that characterize resource utilization, workload statistics, event logs, etc. Unfortunately, legacy "hands-on" techniques, including trial-and-error techniques, are swamped with the amassed measurements (e.g., sensor data, other sensed data). Legacy methodologies have become inadequate in several aspects:

- Legacy techniques don't have the capacity or the sophistication to discern the interrelationships of the measurements—even though such interrelationships comprise information critical to determination of the state of the measured system;
- Legacy techniques depend on thresholds and other naïve statistical measures to make predictions, which often results in wrong predictions and/or missed predictions.

Analysis of a system's health that is based on use of legacy techniques are, at best, marred by inaccuracies and shortcomings, and at worst are completely wrong and misleading.

What is needed in order to advance the art are techniques to model a database cluster so as to determine if and when the cluster's current behavior is normal or is anomalous, and/or whether the cluster's current behavior is predictably headed toward anomalous behavior, and/or whether the cluster's current behavior is predictably headed toward a stable or normal behavior. Still more, what is needed is to determine when an anomaly in the operational state of the cluster has occurred (or early warning that anomalous behavior is about to occur), in order to apply corrective action and/or to rectify the situation to avoid or remediate further anomalous behavior.

The aforementioned legacy technologies do not have the capabilities to generate database cluster health alerts using machine learning. There is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for generating database cluster health alerts using machine learning.

A first database cluster known to be operating normally is measured and modeled using machine learning techniques. A second database cluster is measured and compared to the learned model. More specifically, the method collects a first set of empirically-measured variables of a first database cluster, and using the first set of empirically-measured variables, a mathematical behavior predictor model is generated. Then, after collecting a second set of empirically-measured variables of a second database cluster over a plurality of second time periods, the mathematical behavior predictor model classifies the observed behavior. The classified behavior might be deemed to be normal behavior, or some form of abnormal behavior. The method forms and reports alerts when the classification is deemed to be anomalous behavior, or fault behavior. A Bayesian belief network predicts the likelihood of continued anomalous behavior. The Bayesian belief network can be constructed using two or more sequences from among the empirically-measured variables to calculate a probabilistic estimate of occurrence of moving to a fault state, or of moving to a normal or quiescent state.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 4A is a schematic of a baseline model generation flow used in generating database cluster health alerts using machine learning, according to some embodiments.

FIG. 4B is a schematic showing use of a baseline model to implement a fault detector as used in generating database cluster health alerts using machine learning, according to some embodiments.

DETAILED DESCRIPTION

Figures 1A, 1B:
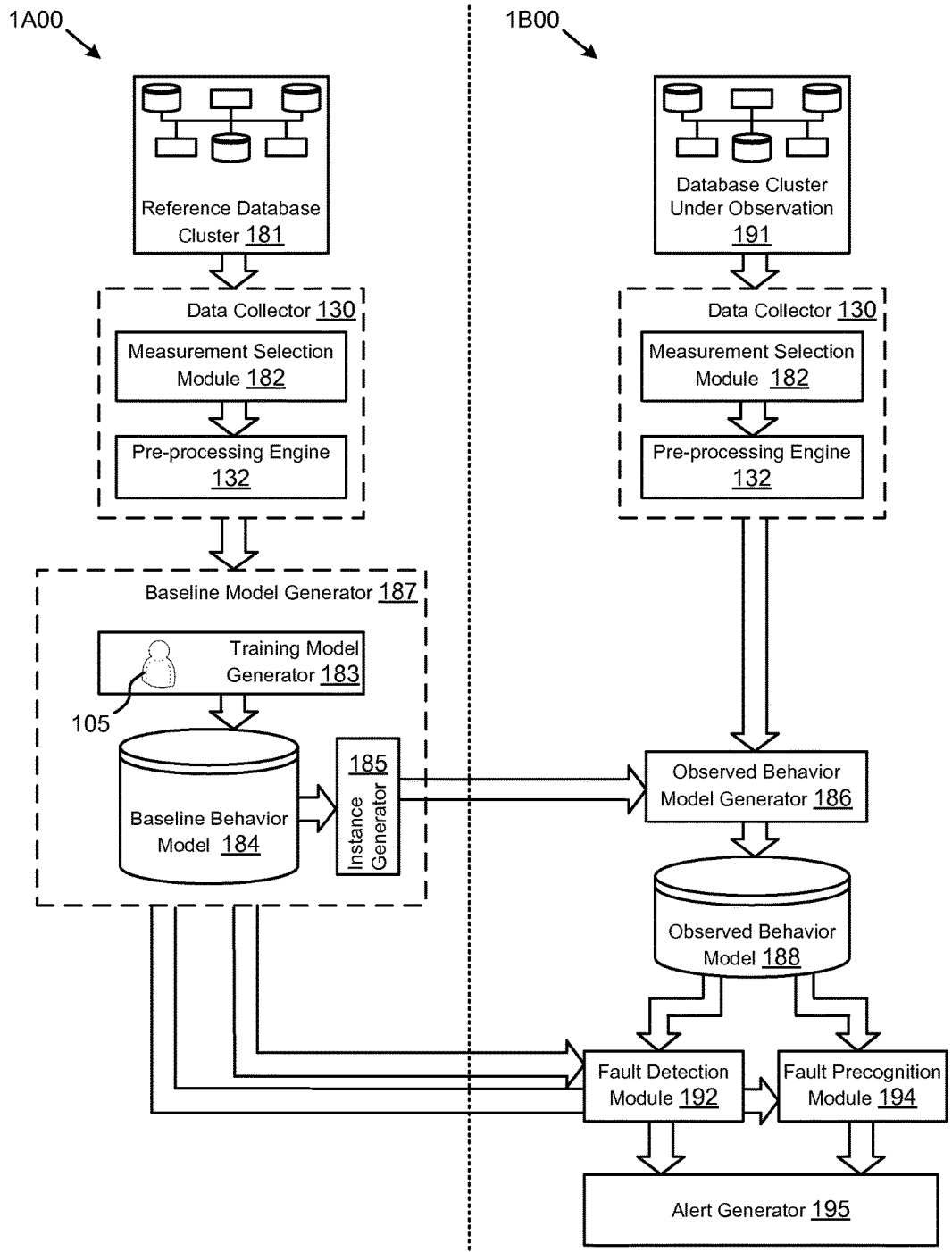
FIG. 1A is a portion of a flow diagram depicting a baseline model generator flow used in systems for generating database cluster health alerts using machine learning, according to some embodiments.
FIG. 1B is a portion of a flow diagram depicting an alert generator flow used in systems for generating database cluster health alerts using machine learning, according to some embodiments.

Some embodiments of the present disclosure are directed to an improved approach for implementing generating database cluster health alerts using machine learning. More particularly, disclosed herein are exemplary environments, methods, and systems for generating database cluster health alerts using machine learning.

Overview

Described herein-below and in the accompanying figures are scalable methods and apparatus for implementing generating database cluster health alerts using machine learning.

Disclosed herein is a computer-implemented method and detector system that estimates if an empirically-measured database cluster is operating in a 'normal range' or if it is operating in the presence of anomalies (or in an anomalous state), or is predictably likely to move into an operating mode characterized by the presence of anomalies (or in the presence a fault). The herein-disclosed techniques analyze empirically-measured variables and use machine learning techniques to estimate if the empirically-measured variables taken from an actually running subject database cluster are deemed to correlate to a "known-good" or otherwise "normal" range. The machine learning techniques examine the empirically-measured variables and compares them to a learned baseline model of a reference database cluster that captures the essence of normal range behavior.

In addition to the aforementioned detector techniques to estimate if the measurements taken from an actual running database cluster are deemed to correlate to a known-good "normal" range, additional disclosed predictor techniques can detect whether the target database cluster is likely to be drifting away from a known normal range behavior, or whether the target database cluster is likely to be drifting toward a known normal range behavior.

In addition to autonomous collection of empirically-measured variables, both the predictor implementation and detector implementation can generate alerts while the database cluster is online and while substantially unattended.

Definitions

Some of the terms used in this description are defined below for easy reference. The presented terms and their respective definitions are not rigidly restricted to these definitions—a term may be further defined by the term's use within this disclosure.

The term "logic" means any combination of software or hardware that is used to implement all or part of the embodiments of the present disclosure.

A "module" includes any mix of any portions of computer memory and any extent of circuitry including hard-wired logic or circuitry embodied as a processor.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A is a portion of a flow diagram depicting a baseline model generator flow 1A00 used in systems for generating database cluster health alerts using machine learning. As an option, the present baseline model generator flow 1A00 may be implemented in the context of the architecture and functionality of the embodiments described herein. Also, the baseline model generator flow 1A00 or any aspect therein may be implemented in any desired environment.

As shown, the machine learning technique of supervised learning is applied. A reference database cluster is measured (and learned) using empirically-captured measurements while the reference database cluster is running a representative workload. The amassed empirically-captured measurements are then analyzed to the extent that a human operator can verify a period of operation as falling into (for example) normal behavior, or not-normal behavior (e.g., anomalous behavior or faulty behavior). It is also possible to use empirically-captured measurements of just the normal behavior and then regard anomalous and faulty behaviors as those measurements that map to models outside of the normal one. Portions of the amassed empirically-captured measurements are then characterized and/or tagged as normal behavior, or some form of anomalous behavior. Such tagging facilitates the supervised learning aspect of the applied machine learning techniques. More specifically, while running a representative workload, a reference database cluster 181 becomes the subject of empirically-captured measurements (e.g., using a data collector 130). The scope of the measurements to be taken, as well as the test points at which the measurements are taken can vary widely; accordingly, the shown data collector includes a measurement selection module 182. The measurement selection module serves to identify the test measurements to be taken, and also serves to facilitate pre-processing (e.g., see pre-processing engine 132) at least to the extent that a measurement taken at a particular test point might be pre-processed in a manner that differs from a measurement taken at a different test point.

The amassed (and possibly pre-processed) empirically-captured measurements are then used to form a baseline model. As is sometimes used in machine learning, observations taken are compared to a baseline model in order to determine if the observations are similar to previously-seen and classified observations. In the situation described here, a baseline model is formed using a supervised learning regime where a user 105 supervises training of a baseline model. Strictly as an example, a user might review output from the data collector 130 (e.g., comprising data collected over a specific time period) and might determine that the collected data is representative of normal behavior of the reference database cluster. Or, a user 105 might review output from the data collector and might determine that the collected data is representative of anomalous behavior of the reference database cluster. Performing such supervised learning over a series of time periods where the user is able to identify normal ranges of behavior of the reference database cluster results in a baseline behavior model. In the embodiment of FIG. 1A, the resulting model is shown as baseline behavior model 184. Such a model can be stored in a persistent storage location, or can be embodied as a computer program known as a classifier. In the exemplary implementation shown in the baseline model generator flow 1A00, the baseline model generator 187 subsumes a training model generator 183, together with its outputs in the form of a baseline behavior model 184. As shown the baseline model generator 187 further subsumes an instance generator 185.

Outputs of the baseline model generator 187 are received by a behavior classifier (e.g., test behavior classifier of FIG. 1B), which in turn compares the model from the reference database cluster to the model generated from data collected from a database cluster under observation.

FIG. 1B is a portion of a flow diagram depicting an alert generator flow 1B00 used in systems for generating database cluster health alerts using machine learning. As an option, the present alert generator flow 1B00 may be implemented in the context of the architecture and functionality of the embodiments described herein. Also, the alert generator flow 1B00 or any aspect therein may be implemented in any desired environment.

As discussed in the foregoing, one capability of the herein-disclosed systems is to generate database cluster health alerts. As previously discussed, observations taken from a subject database cluster (e.g., database cluster under observation 191) can be used to generate an observed behavior model 188, which model is in turn used in comparisons against a baseline model, and thus assess the current health state of the measured system and/or predict a future health state (e.g., upcoming problem) of the measured system. Accordingly FIG. 1B employs an observed behavior model generator 186 to generate a database of observations taken from the database cluster under observation 191 for comparison against a baseline model. Such comparisons can serve to identify faults in the database cluster under observation, and/or combinations of such comparisons can serve to predict a likelihood of upcoming faults in the database cluster under observation.

More specifically, using the training data as given in the baseline behavior model 184 that was generated using supervised learning, the alert generator flow 1B00 implements a fault detection capability (e.g., fault detection module 192) and a capability (e.g., fault precognition module 194). Upon detection or prediction of a fault the alert generator flow 1B00 emits corresponding alerts (e.g., using alert generator 195).

Figure 2:
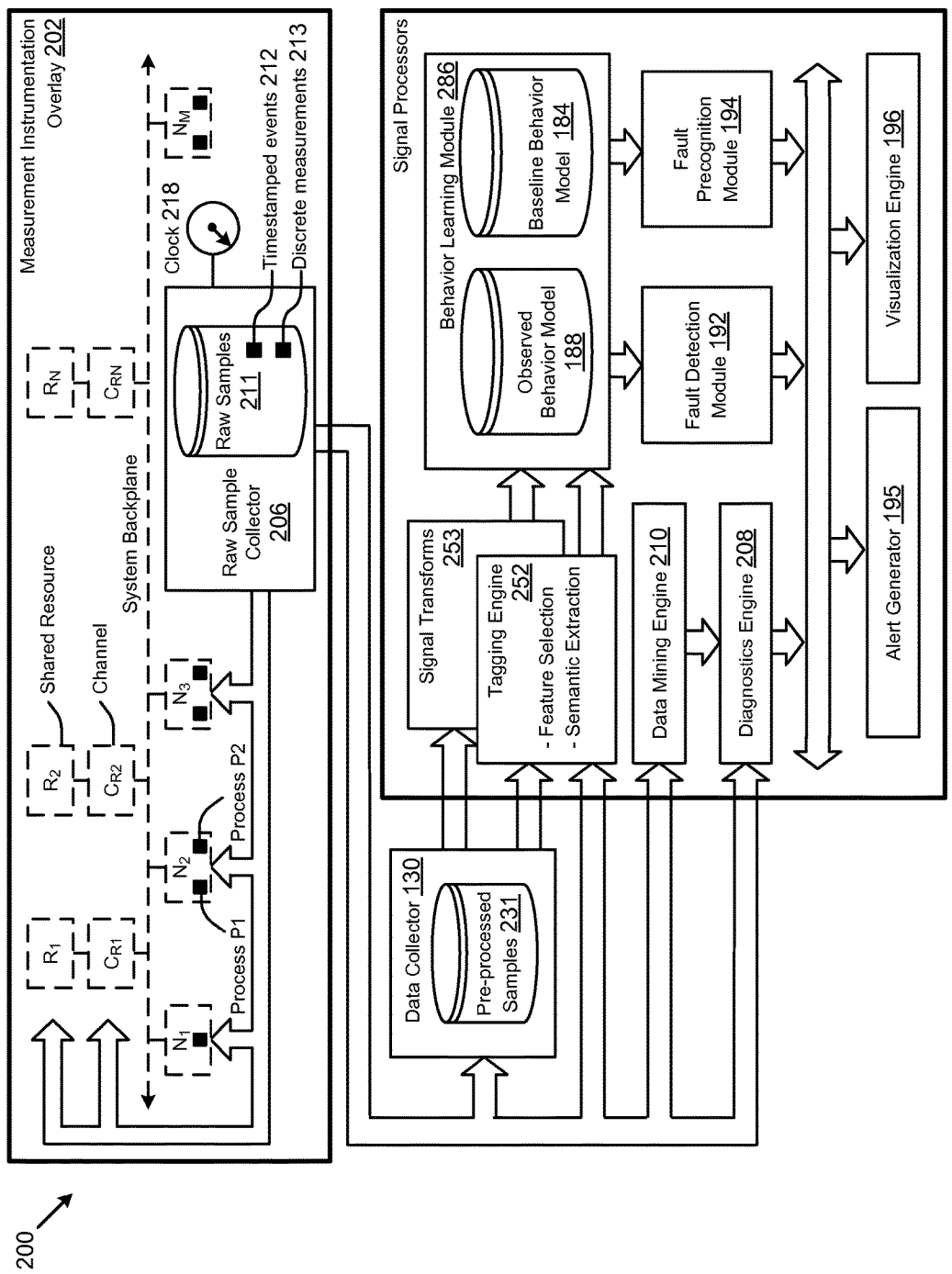
FIG. 2 shows empirical data collection and processing subsystems used for generating database cluster health alerts using machine learning, according to some embodiments.

FIG. 2 shows empirical data collection and processing subsystems 200 used for generating database cluster health alerts using machine learning. As an option, the present empirical data collection and processing subsystems 200 may be implemented in the context of the architecture and functionality of the embodiments described herein. Also, the empirical data collection and processing subsystems 200 or any aspect therein may be implemented in any desired environment.

The constituent components as shown in the block diagram serve for analyzing database cluster behavior (e.g., longest wait state behavior, shortest wait-state behavior, process-to-process contention, etc.) by the transformation of large and extensive volumes of raw sensory data and other diverse measurement data into a few but sufficient state-insinuating forms. In an exemplary embodiment, pre-processed data is sufficiently formatted such that learning models can be applied in order to distill them into database cluster features and behaviors (e.g., determining current state, predicting cluster services availability, predicting drifts into anomalous states, determining an overall health state, etc.).

In the embodiment shown, a measurement instrumentation overlay 202 comprising one or more measurement instruments is configured to take measurements of a subject database cluster system using various measurement instruments (e.g., an operating system monitor, an interrupt routine, etc.). The database cluster under observation can be a large and complex system, and as shown, the database cluster under observation comprises a number of nodes (e.g., $N_1$, $N_2$, $N_3$, $N_M$), that communicate with a number of resources (e.g., shared resource $R_1$, shared resource $R_2$, shared resource $R_N$), through channels (e.g., channel $C_{R1}$, channel $C_{R2}$, channel $C_{RN}$, etc.), over a communication network (e.g., system backplane). Alternatively, the database cluster under observation can comprise a single node (e.g., just $N_1$), that communicates with a number of resources (e.g., shared resource $R_1$) through a channel (e.g., channel $C_{R1}$).

During operation of the database cluster under observation, a raw sample collector 206 receives large volumes of unrefined, raw sensory data and extensive collections of system snapshot data. The raw sample collector 206 can receive such data at high rates and in high volumes using known-in-the-art techniques, and a raw sample collector 206 can store raw data into a database of raw samples 211 comprising any number of timestamped events 212 and/or discrete measurements 213. Any raw samples of whatever form can be time stamped with a clock time using a real-time clock 218 to produce timestamped samples (e.g., that capture a snapshot of the hardware device or software condition being sampled) or timestamped events (e.g., which timestamped events may have been sampled in response to the occurrence of an interrupt or other raising of an event).

Timestamped events 212 can be abstracted. For example, a large collection of data in the form of a system snapshot might be in fact collected over a lengthy time period, yet, the raw sample collector 206 might timestamp the system snapshot with only two timestamped events 212, namely a timestamp corresponding to a start event (e.g., the clock time of the first collected raw sample of the system snapshot), and an ending event (e.g., the clock time of the last collected raw sample of the system snapshot).

As an overview of the implementation of the machine learning techniques depicted in FIG. 2, after the raw data is sampled (see raw sample collector 206), the raw samples are processed so as to support downstream processing. Many techniques for downstream processing are disclosed herein, and many of those techniques can be chained together to achieve some particular state of analysis and/or configuration. The description given here in this discussion of FIG. 2 is purely illustrative and other selections of techniques and/or order of application of the techniques is possible and envisioned.

A data collector 130 performs operations to group raw samples and perform operations for data cleaning, merging, and reduction. In this stage, noise and redundancies in raw samples will be filtered out, and the data relevant to a set of identified processes (e.g., sessions) and a set of identified resources will be gathered and stored into a database of pre-processed samples 231. The measurements (e.g., in the form of pre-processed samples 231, or in the form of raw samples 211) are made accessible to a variety of signal processors, which may be in the form of the behavior learning module 286, an alert generator 195, a diagnostics engine 208, a data mining engine 210, a visualization engine 196, or other signal processors (see FIG. 6).

The behavior learning module 286 can perform math and set operations (e.g., normalizations) to compare the aforementioned baseline behavior model 184 with the observed behavior model 188. One result from operation of the behavior learning module 286 is to produce signals in a form suited for the fault detection module 192 and for the fault precognition module 194. The operations of fault detection module 192 and operations of the fault precognition module 194 are further discussed infra.

Strictly as an example, the behavior learning module 286 can receive a stream of raw samples 211 or can receive a stream of transformed data (e.g., continuous signals from instances of signal transforms 253) or the behavior learning module 286 can receive a stream of data that has been pre-tagged with semantics and/or pre-tagged with feature identification tags (e.g., see tagging engine 252).

Figure 3:
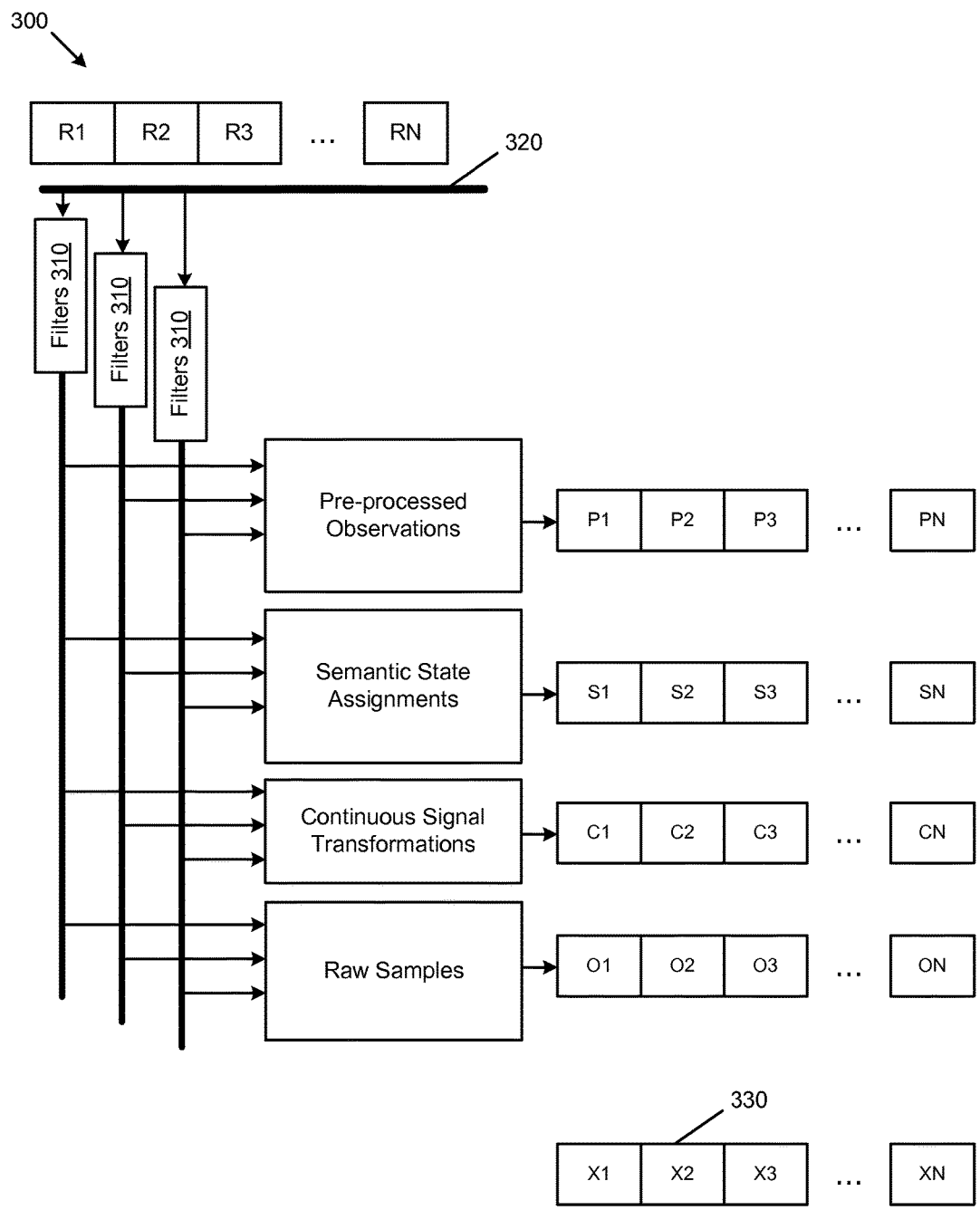
FIG. 3 is a block diagram of an observation collector subsystem used for generating database cluster health alerts using machine learning, according to some embodiments.

FIG. 3 is a block diagram 300 of an observation collector subsystem used for generating database cluster health alerts using machine learning. As an option, the present block diagram 300 may be implemented in the context of the architecture and functionality of the embodiments described herein. Also, the block diagram 300 or any aspect therein may be implemented in any desired environment.

As shown raw observations (e.g., shown as R1, R2, R3, . . . , RN) are taken by any known techniques, for example, using a raw sample collector 206. The raw observations are taken off a measurement bus 320 then filtered (e.g., using filters 310) and further processed by the shown processing blocks (e.g., using a pre-processor, assigning a semantic state, transforming into a continuous signal, etc.). The outputs of the respective processing blocks are time sequenced observations. For example, the outputs P1, P2, P3, . . . , PN from the pre-processed observations block might represent time sequenced observations taken from the input raw observations (e.g., shown as R1, R2, R3, . . . , RN) minus certain raw observations that are deemed to be noisy or spurious. Similarly, the outputs S1, S2, S3, . . . , SN from the semantic state assignment block might represent time sequenced observations corresponding to a time sequence of changes in the determined states of a particular series of observations. The time sequenced observations may be highly abstracted. For example, a given set of time sequenced observations may comprise only a few observations for a particular time period, even though there were many more raw observations collected over the same particular time period. Any forms of the time sequenced observations can be used in formulating mathematical models to be used as classifiers and/or predictors. For example, the outputs P1, P2, P3, . . . , PN from the pre-processed observations block might represent time sequenced observations X1, X2, X3, . . . , XN (see sequence of observations 330). Any series of observations can be used as a time-ordered sequenced of observations X1, X2, X3, . . . , XN for developing and using mathematical models, which mathematical models are now briefly discussed.

FIG. 4A is a schematic of a baseline model generation flow 4A00 used in generating database cluster health alerts using machine learning. As an option, the present baseline model generation flow 4A00 may be implemented in the context of the architecture and functionality of the embodiments described herein. Also, the baseline model generation flow 4A00 or any aspect therein may be implemented in any desired environment.

The function K(x) as shown in FIG. 4A is a result of processing using empirically-collected, non-faulty data as measured at a database cluster for which the nature of the states are known (e.g., known by a user). The technique involves the capture of measurable variables, and supervising the codification of this training data into a mathematical baseline model using one or more mathematical formulations (e.g., the baseline behavior model 184), which is in turn used to construct a predictor. The predictor codifies observations into an observed model (also a mathematical model) of the measured environment (e.g., a database cluster under observation 191) and can compare and contrast aspects of the observed model to the learned baseline model.

As shown, the formulation 402 constructs a baseline model on the basis of empirical measurements as obtained from the reference database cluster together with inputs from a human user or operator. For example, if an operator were to provide a time window (e.g., described in terms of start time and end time) during which time window the reference database cluster is believed to be operating normally, then the aggregation of the empirical measurements would be trained to be suggestive of normal operation. Certain forms of filters or processors (see FIG. 3) might employ some safeguards used to validate user/operator indications (e.g., the system is operating normally) and user/operator assumptions, thus relaxing any reliance on users to come up with highly accurate training data. Many mathematical formulations 402 are adequate to capture the nonlinear aspects of database cluster operations.

A baseline model (e.g., any one or more mathematical models 404) is formed using mathematical formulations 402 in combination with observations (e.g., observations from a reference database cluster). Subsequently or in parallel, measurement taken from a different environment (e.g., a database cluster under observation) can be used to form an observed model (e.g., observed behavior model 188) and further processing can compare and contrast aspects of the observed model to the baseline model. When differences are detected they suggest anomalous behavior. The techniques disclosed herein can detect and classify observed anomalous behavior (see FIG. 4B), and they can also predict likely soon-to-occur anomalous behavior.

FIG. 4B is a schematic showing use of a baseline model to implement a fault detector 4B00 as used in generating database cluster health alerts using machine learning. As an option, the present baseline model to implement a fault detector 4B00 may be implemented in the context of the architecture and functionality of the embodiments described herein. Also, the baseline model to implement a fault detector 4B00 or any aspect therein may be implemented in any desired environment.

The shown predictor 406 accepts a set of measurement values in the form of database cluster system variables (e.g., the shown sequence of observations), and then produces a prediction (or approximation) of what the actual values for these set of measurement would look like when the observed system is behaving in a known-good fashion under current circumstances (e.g., based on the baseline model) under the currently observed set of measurements. In this embodiment, the predictor 406 runs one or more mathematical operations including operations to smooth the input in order to facilitate comparisons to the already established baseline model.

In exemplary cases, the statistical classifier 408 detects differences (or similarities) between the baseline model behaviors and the observed model behavior. The differences capture the shift (if any) between the known-good approximation behavior used in the predictor 406, and the currently observed behavior. Several statistical measures are used to characterize the differences. Application of this methodology is that the variance between the given measurement values and the approximations produced by the predictors are statistically sound quantities that can reliably be used by fault detectors to characterize the operating state of the target database system, and generate alerts as needed. In certain cases (e.g., when selecting certain types of raw data) the input sequence of observations from a known-good system are expected to oscillate over a wide range. In other cases observations from a known-good system are expected to remain flat or linear over a priori known time periods. And, in exemplary cases, both types (and still more types of signal behavior) are expected to occur in real systems. Accordingly exemplary signal processors (e.g., including classifiers and predictors) can employ several different mathematical models. In some cases, one or more of the several different mathematical models are selected in real-time. Strictly as an example, a particular set of mathematical models can be selected based on a fit to the observations.

In another embodiment, the techniques disclosed serve to determine whether the database cluster under observation is operating within expected bounds of normal behavior or if it has drifted (or will soon drift) into some anomalous state. The shown fault detector works by contrasting its input values (measurements obtained directly from the database cluster under observation) to one or more statistical models that capture both normal and abnormal patterns of the target system behavior. The fault detector components can employ linear and nonlinear models and can operate unattended, or with only minimal user intervention. In some embodiments, a particular state classification can be assigned to the current sequence of observations, and a series of transitions from state to state can result in a sequence of state observations, {S1, S2, S3, . . . SN}. Such transitions and the probability of reaching a particular next state based on a current state can be modeled using a Bayesian belief network. Further, a Bayesian belief network can be constructed using computer-implemented techniques.

Figure 4D:
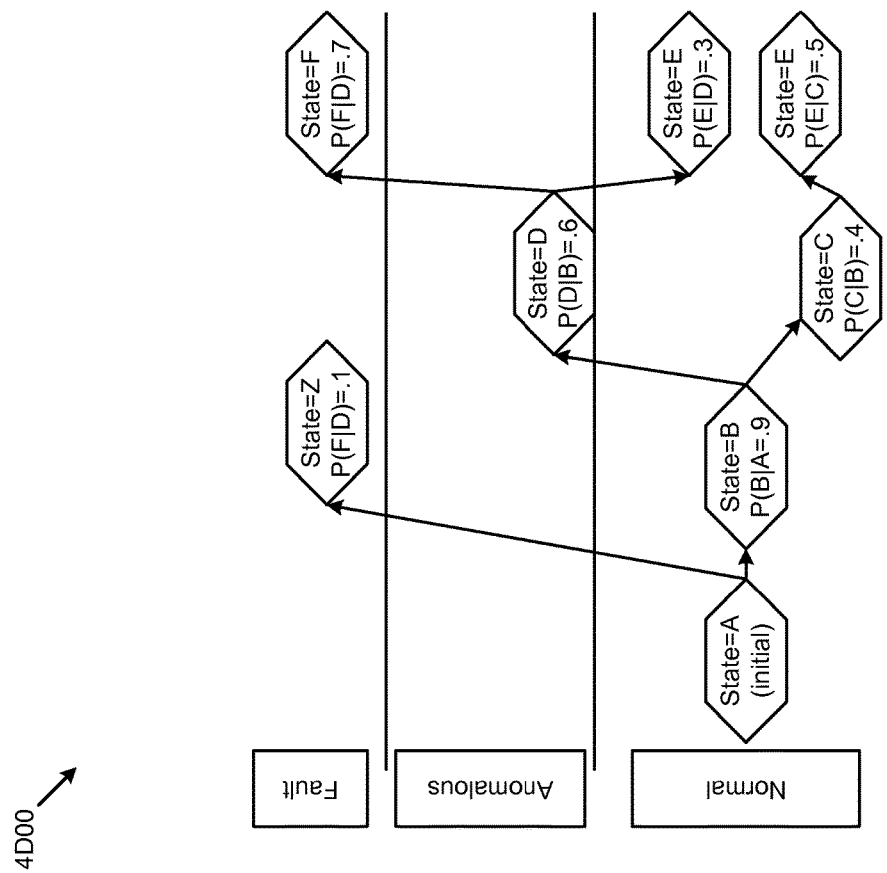
FIG. 4D shows a simplified Bayesian belief network as used in systems for generating database cluster health alerts using machine learning, according to some embodiments.
Figure 4C:
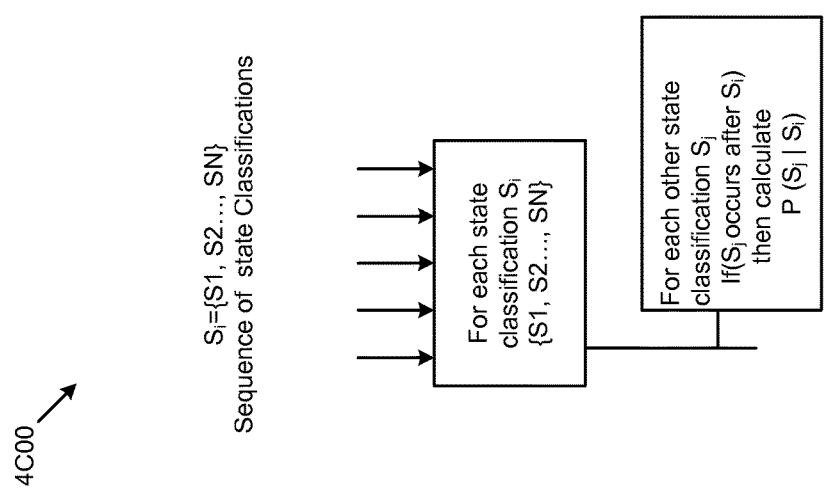
FIG. 4C shows a flow diagram to implement a Bayesian belief network as used in systems for generating database cluster health alerts using machine learning, according to some embodiments.

FIG. 4C shows a flow diagram to implement a Bayesian belief network 4C00 as used in systems for generating database cluster health alerts using machine learning. As an option, the present flow diagram to implement a Bayesian belief network 4C00 may be implemented in the context of the architecture and functionality of the embodiments described herein. Also, the flow diagram to implement a Bayesian belief network 4C00 or any aspect therein may be implemented in any desired environment.

One possible computer-implemented technique to construct a Bayesian belief network involves exhaustive calculation of the observed probability of reaching a particular state based on the previous state (or previous sequence of states). Some next states never occur after a particular previous state, and some previous states may traverse to a multitude of other states, each with a given probability. Such Bayesian probabilities (e.g., the likelihood that state B is reached after reaching state A) can be calculated based on a corpus of observations. Observations from both a known-good system, as well as from known faulty or known soon-to-fail systems, are often included in such a corpus.

FIG. 4D shows a simplified Bayesian belief network 4D00 as used in systems for generating database cluster health alerts using machine learning. As an option, the simplified Bayesian belief network 4D00 may be implemented in the context of the architecture and functionality of the embodiments described herein. Also, the Bayesian belief network or any aspect therein may be implemented in any desired environment.

As shown, state B is observed to be reached after reaching state A 90% of the time, whereas state Z is observed to be reached after reaching state A 10% of the time. And, state D is observed to be reached after reaching state B 60% of the time, whereas state C is observed to be reached after reaching state B 40% of the time.

Continuing this example, it is observed that state F (a fault state) is observed to be reached after reaching anomalous state D 70% of the time, although it is possible (30% of the time) to return to a normal state E after an anomalous state D 70% of the time.

Using such a Bayesian belief network, a fault detector such as fault detector 4B00 can determine the likelihood that a next state will be an anomalous state (e.g., drifting toward a fault), or a fault state, or a normal state (e.g., drifting towards normal behavior).

Strictly as an example, concurrent faults generated by the fault detectors could also be arranged (possibly together with observed data) in a Bayesian belief network that could be used to determine the root causes of the active anomalous state, and hence provide meaningful explanations on why and how the observed system got into its anomalous state.

Figure 5:
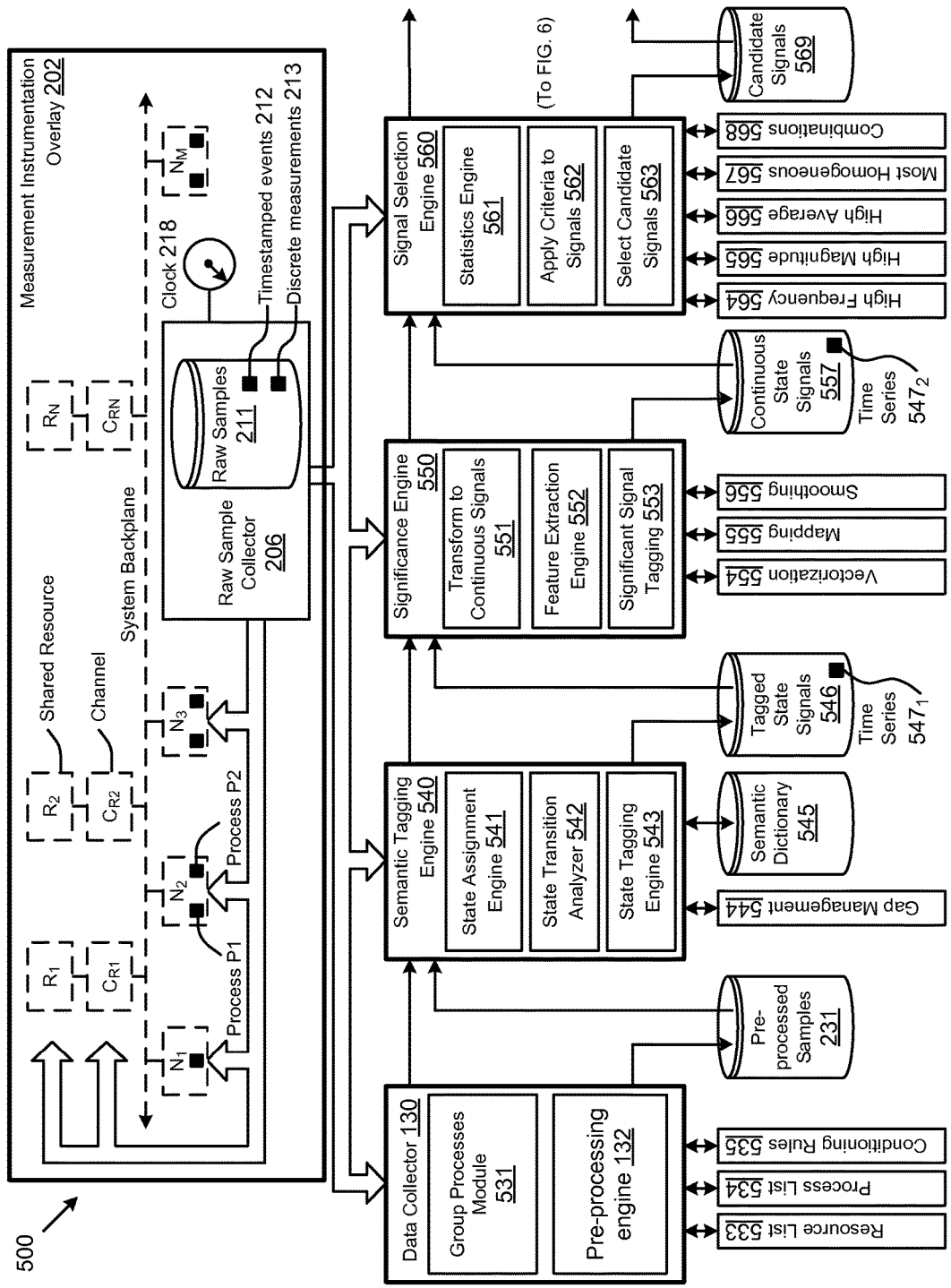
FIG. 5 shows an environment to capture empirical data as used in systems for generating database cluster health alerts using machine learning, according to some embodiments.

FIG. 5 shows an environment 500 to capture empirical data as used in systems for generating database cluster health alerts using machine learning. As an option, the present environment 500 may be implemented in the context of the architecture and functionality of the embodiments described herein. Also, the environment 500 or any aspect therein may be implemented in any desired environment.

As previously indicated, raw data is collected using the measurement instrumentation overlay 202 and the raw samples are processed so as to support downstream processing. Various techniques for downstream processing are disclosed herein, and many of those techniques can be chained together to achieve some particular state of analysis and/or configuration. The description given here in this discussion of FIG. 5 is purely illustrative and other selections of techniques and/or order of application of the techniques is possible and envisioned.

As previously introduced, a data collector 130 performs operations to group processes (see module 531) and performs operations for data cleaning, merging, and reduction. In this stage, noise and redundancies in raw data will be filtered out, and the data relevant to a set of identified processes (e.g., sessions) and a set of identified resources will be gathered (e.g., see pre-processing engine 132) and stored into a database of pre-processed samples 231. In some embodiments, downstream processing includes semantic tagging (see semantic tagging engine 540). The tagged state signals 546 are received as inputs by a series of modules configured to transform the discrete signals into continuous state signals (see significance engine 550), which signals can be codified in whole or in part and/or in various forms of tagged and/or untagged portions of time series $547_1$. Given the amplified signals as a result of the processing in the significance engine, a further downstream module (see signal selection engine 560) operates on a hypothesis (e.g., forms hypothesis, tests hypothesis, and selects candidate signals based on the results of the hypothesis testing). The fewer number of representative signals that most likely confer the state of the system can now be processed by an agent using one or more signal processors.

Again referring to the data collector 130, this engine serves to identify the groups of processes that are accessing particular resources (e.g., shared resource $R_1$, shared resource $R_2$, shared resource $R_N$). The data collector 130 also serves for distilling, cleaning and the validating of raw input data, possibly using the shown pre-processing engine 132. The pre-processing engine 132 and operations therein serve many pre-processing steps including reducing the amount of stochastic noise that is often present in the raw samples (e.g., as a by-product of the discrete nature of measuring in discrete time samples). Strictly as an example, a pre-processing engine can filter out noise and redundant data, and can check for outliers (e.g., measurements, samples or readings that are deemed to be corrupt or deemed to be unrealistically excessive). In some cases a pre-processing engine 132 can replace outliers by estimated or clamped or interpolated values. In other cases outliers can be eliminated from further analysis. In some situations the raw data is projected in terms of multiple dimensions. For example, processes within a pre-processing engine can define a fixate point (e.g., an anchor point) pertaining to a particular resource or event (or other measurement or aspect of a measurement) and then examine the data relative to the fixate point in order to determine relative aspects such as corresponding processes and their time spent in various states relative to the fixation point.

The foregoing are merely illustrative examples of pre-processing and storing into a database of pre-processed samples 231. Further operations and data structures facilitate flexibly chaining techniques from one to another. For example, a data collector can be implemented with several plug-ins for data storage and algorithms. As shown, the data collector of FIG. 5 uses plug-ins for a resource list 533, a process list 534, and a plug-in for data conditioning rules 535.

Continuing with the discussion of FIG. 5, a series of semantic tagging processes are performed by a semantic tagging engine 540. Of course raw data, even if pre-processed as described in the foregoing paragraph, is just raw data. What is often desired is to map meaning (e.g., semantics) onto the pre-processed data. In general terms, a semantic tagging engine serves to assign states (e.g., using a state assignment engine 541) and make determinations as to the state and state transitions of a given process with respect to a particular shared resource. For example, it might be determined (e.g., from the pre-processed signals) that a process P1 had been in a wait state, waiting on a shared resource R1 for a period during which another process P2 had gained repeated access to shared resource R1. This scenario illustrates that there is (or can be) meaning to a sequence of measurements. Further, the extraction of the pre-processed data into some meaning can be performed by an automatic process such as a state assignment engine 541, a state transition analyzer 542, and/or a state tagging engine 543.

In exemplary embodiments, there are many semantics that can be lifted or extracted from the pre-processed data. Accordingly, the semantic tagging engine 540 combines the services of a semantic dictionary 545 and a state tagging engine 543. Using the semantic dictionary and a state tagging engine, the semantic tagging engine 540 can assign a discrete semantic state to processes, and changes over time of the discrete semantic state can be analyzed to identify state changes of interest, and further processing can perceive the meaning (e.g., semantics) of the state changes. Using the semantic dictionary, the semantics can be tagged onto the state signals and stored in a persistent (or non-persistent) storage location (e.g., see database of tagged state signals 546), or can be provided as a sequence such as are shown as the outputs S1, S2, S3, . . . , SN from the semantic state assignment block (see FIG. 3). The occurrence of semantics for observable occurrences of signals and signal transitions can be codified as human-discernible words or phrases, and thus presents a model conducive to human understanding.

In some situations, state transitions, and hence the semantics derived from state transitions, are temporally dispersed. For example, a process might sleep for a long time in one state, and then come out of that state when moving to another state. Accordingly, some implementations employ one or more techniques for gap management (e.g., note gap management plug-in 544). A gap can take on many forms; for example, a gap can refer to the periods where a particular shared resource process is absent from the raw data. In some cases a gap may be artificially filled via an assumed value (e.g., '0') or it can be filled in via an interpolation technique. In exemplary flows, techniques are applied to identify significance in the tagged state signals. The significance engine and its constituents are now briefly discussed.

The significance engine 550 and its constituents produce vectorized values that are continuous over time or an epoch of time (see vectorization plug-in 554). Each value in a vector represents the magnitude or state of a particular feature or metric (e.g., the state of a tracked resource at a particular point in time). The production of such values typically involves the transformation or mapping of multi-dimensional data (e.g., data tagged with different semantics from the previous processes) into a compound magnitude/value that reasonably conveys a statistical significance of the resource. A compound magnitude/value can comprise a single value that is derived from several values possibly with different semantics. For example, a single value can be derived from several values using an algorithm or other technique for interpretation.

The smoothing plug-in 556 serves to filter out large changes in signals. It is often an undesirable circumstance when a signal fluctuates excessively. High fluctuations (e.g., possibly due to sampling procedures) can sometimes unfairly skew statistical analysis and such skew risks compromising the usefulness of the signal.

After the significance engine performs vectorization (e.g., see vectorization plug-in 554), mapping (e.g., see mapping plug-in 555) and smoothing (e.g., see smoothing plug-in 556), the significance engine employs a transform to continuous signals 551, which transforms the tagged state signals 546 into continuous signals suited for input into a feature extraction engine 552. The continuous signals now being in a vector form that includes vectors of feature are suited for significant signal tagging 553. The signals as processed by the significance engine can be stored in a database of continuous state signals 557. The mere occurrence of a particular signal in the database of continuous state signals 557 as output by the significance engine does necessarily mean that that particular signal is useful in developing insight. On the contrary, the occurrence of a signal in the database of continuous state signals 557 as output by the significance engine only means that the signal was not deemed to be insignificant and/or was not deemed to be in error to the extent that it was eliminated, and in exemplary cases, a database of continuous state signals 557 would also comprise tagged or untagged portions of a time series $547_2$. The determination as to whether or not a signal is deemed to be a good candidate for human or agent analysis is an operation of the signal selection engine 560, which is now briefly discussed.

Again referring to the signal selection engine 560, and more particularly to the operation to select candidate signals 563, the selection criteria can be driven, at least in part, on statistical measures. For example, a signal might be selected because it has a statistically-high average magnitude value with respect to other signals in a statistical population. Of course, high average is only one possibility. Other quantitative criteria can be defined, and a plug-in generated so as to facilitate this architecture. Commonly used quantitative criteria include high frequency of being observed, high magnitude value, most homogeneous, and others, and combinations of the foregoing. As shown, the high frequency criteria, high magnitude criteria, high average criteria, and most homogeneous criteria are implemented in plug-ins, namely the high frequency plug-in 564, high magnitude plug-in 565, high average plug-in 566, most homogeneous plug-in 567, and a combination plug-in 568.

Given the database of continuous state signals 557, a signal selection engine 560 employs a statistics engine 561 that applies statistical or other quantitative criteria to signals 562 and, based on the result of the foregoing, performs an operation to select candidate signals 563. Candidate signals are stored in a database of candidate signals 569, which candidate signals in turn become the subject of one or more signal processors (see FIG. 6). Use of such signal processors (e.g., an alert generator 195) can suggest action to be taken.

Figure 6:
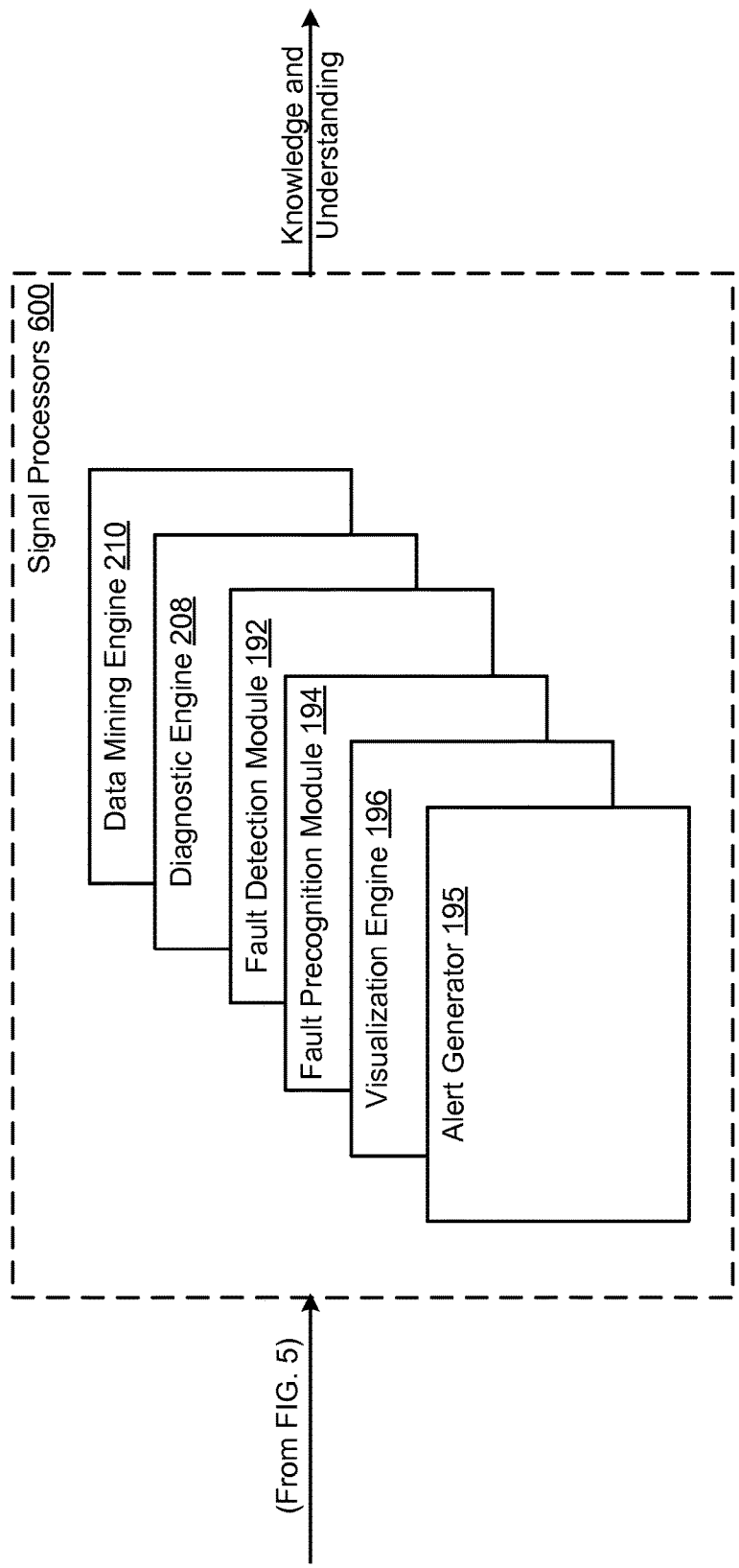
FIG. 6 shows an example selection of signal processors used in systems for generating database cluster health alerts using machine learning, according to some embodiments.

FIG. 6 shows an example selection of signal processors 600 used in systems for generating database cluster health alerts using machine learning. As an option, the present selection of signal processors 600 may be implemented in the context of the architecture and functionality of the embodiments described herein. Also, the selection of signal processors 600 or any aspect therein may be implemented in any desired environment.

As shown, the example selection of signal processors 600 includes an alert generator 195, a visualization engine 196, a fault detection module 192, a fault precognition module 194, a diagnostics engine 208, and a data mining engine 210. Use of the signal processors serves to render knowledge and understanding of the nature of the states (e.g., health state) and state transitions of the observed system.

Additional Embodiments of the Disclosure

Figure 7:
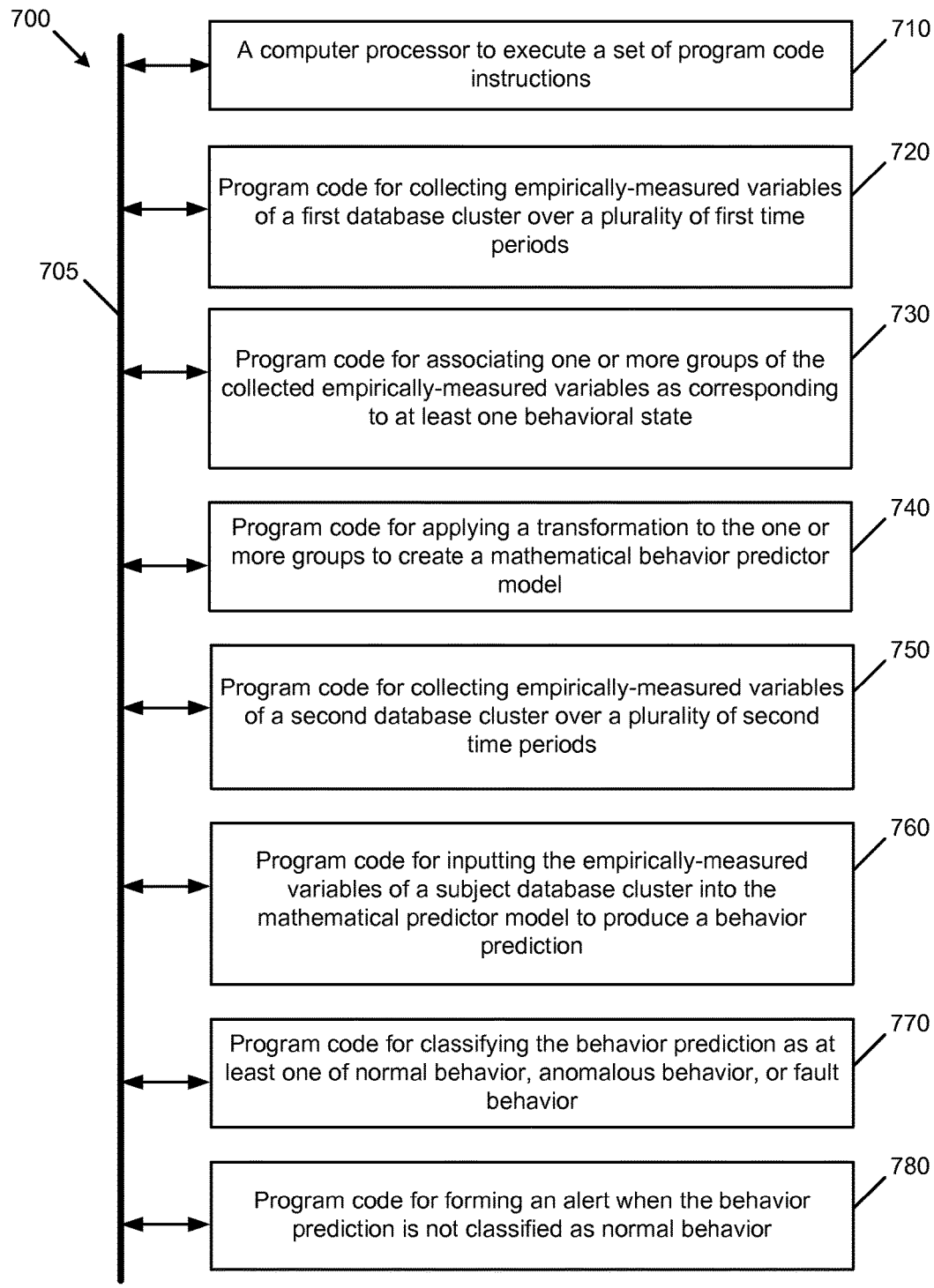
FIG. 7 exemplifies a system for generating database cluster health alerts using machine learning, according to some embodiments.

FIG. 7 exemplifies a system for generating database cluster health alerts using machine learning, according to some embodiments. As an option, the present system 700 may be implemented in the context of the architecture and functionality of the embodiments described herein. Of course, however, the system 700 or any operation therein may be carried out in any desired environment.

As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: collecting empirically-measured variables of a first database cluster (e.g., a reference database cluster) over a plurality of first time periods (see module 720); and associating one or more groups of the collected empirically-measured variables as corresponding to at least one behavioral state (see module 730). For example, the association can comprise tagging (e.g., with XML entities, attributes or attribute values) one or more groups of the collected empirically-measured variables as corresponding to at least one behavioral state.

The system 700 continues by applying a transformation (e.g., transforming into a time series format and isolating signals from the time series) to the one or more groups to create a mathematical behavior predictor model (see module 740). Then, having a mathematical behavior predictor model, the system continues by: collecting empirically-measured variables of a second database cluster (e.g., a subject database cluster) over a plurality of second time periods (see module 750); inputting the empirically-measured variables of a subject database cluster into the mathematical predictor model to produce a behavior prediction (see module 760); classifying the behavior prediction as at least one of normal behavior, anomalous behavior, or fault behavior (see module 770).

The classifying operations can use a parametric classifier (e.g., a Gaussian) or a non-parametric classifier in order to classify a particular observation, or its prediction, as belonging to either normal or anomalous behavior. The classifying operation produces more reliable results when operating on prediction and observed values together. For example, while observation values may naturally exhibit large fluctuations with complicated attributes, examining them together with their corresponding prediction values, generated by the predictors, tend to improve the reliability of fault and alarm detectors. It is typically easier and more accurate to detect drifts, even subtle ones, when contrasting simple signals than complex ones. Hence, this technique decreases the occurrence rates of false alarms and missed alarms. As shown in this implementation of system 700, a module is provided for forming an alert when the behavior prediction is not classified as normal behavior (see module 780).

To facilitate precognition of a database cluster fault, some implementations of system 700 include identifying a sequence of behavioral states in order to calculate a Bayesian belief network. The calculated Bayesian belief network can then be used to calculate a probabilistic estimate of occurrence of a fault state based on an observed traversal to or through one or more previous states in the Bayesian belief network.

In some embodiments, a predictor system such as the system 700 provides modules for generating a residual stream. The predictor generates an approximated value of what the current observation value is expected to be for the observed variables. To produce its approximations (e.g., approximated values) the predictor relies on (1) the learned mathematical model of the system (e.g., based on the system under test behaving normally) and (2) the current observed model of the system. Since it is possible that even under non-anomalous operating conditions, observed values of variables can sometimes exhibit large fluctuations (e.g., that span the entire normal behavior range), it becomes harder on fault detectors to reliably distinguish between normal and abnormal variations based on the observed values alone. Residual values represent the differences between the observed values and their corresponding predictions as determined by the predictors; hence some embodiments present residual values as a stream, and some embodiments may deliver a stream of residual values in parallel with or interleaved with the observed and predicted streams. Residual values are typically reduced to a stream of values (e.g., one or more signals) comprising statistical characteristics that can be tracked by fault detectors with relative ease and enhanced reliability to discern any anomalous deviation in system behavior. Using this technique, possibly in combination with the other techniques herein-disclosed, even subtle anomalous deviations in a system's behavior can be discerned by a fault detector.

Figure 8:
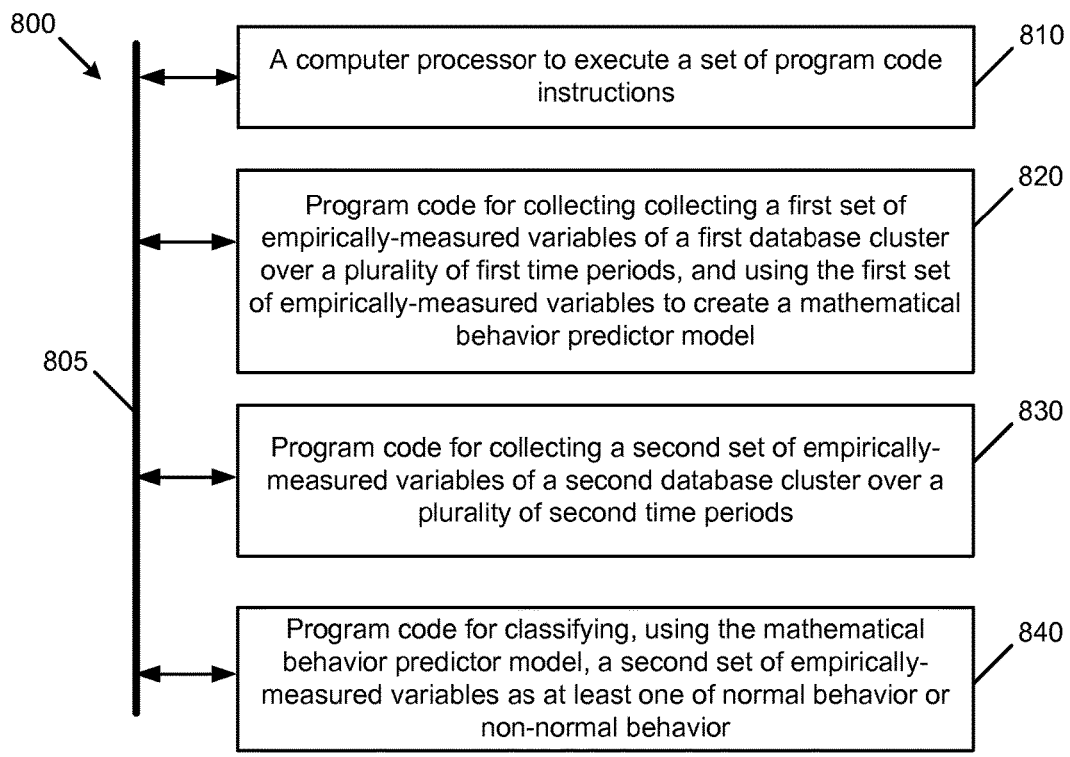
FIG. 8 exemplifies a system for generating database cluster health alerts using machine learning, according to some embodiments.

FIG. 8 exemplifies a system for generating database cluster health alerts using machine learning. As an option, the present system 800 may be implemented in the context of the architecture and functionality of the embodiments described herein. Of course, however, the system 800 or any operation therein may be carried out in any desired environment. As shown, system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The embodiment of FIG. 8 implements a portion of a computer system, shown as system 800, comprising a computer processor to execute a set of program code instructions (see module 810) and modules for accessing memory to hold program code instructions to perform: collecting a first set of empirically-measured variables of a first database cluster over a plurality of first time periods, and using the first set of empirically-measured variables to create a mathematical behavior predictor model (see module 820); collecting a second set of empirically-measured variables of a second database cluster over a plurality of second time periods (see module 830); and classifying, using the mathematical behavior predictor model, a second set of empirically-measured variables as at least one of, normal behavior, or non-normal behavior (see module 840).

System Architecture Overview

Figure 9:
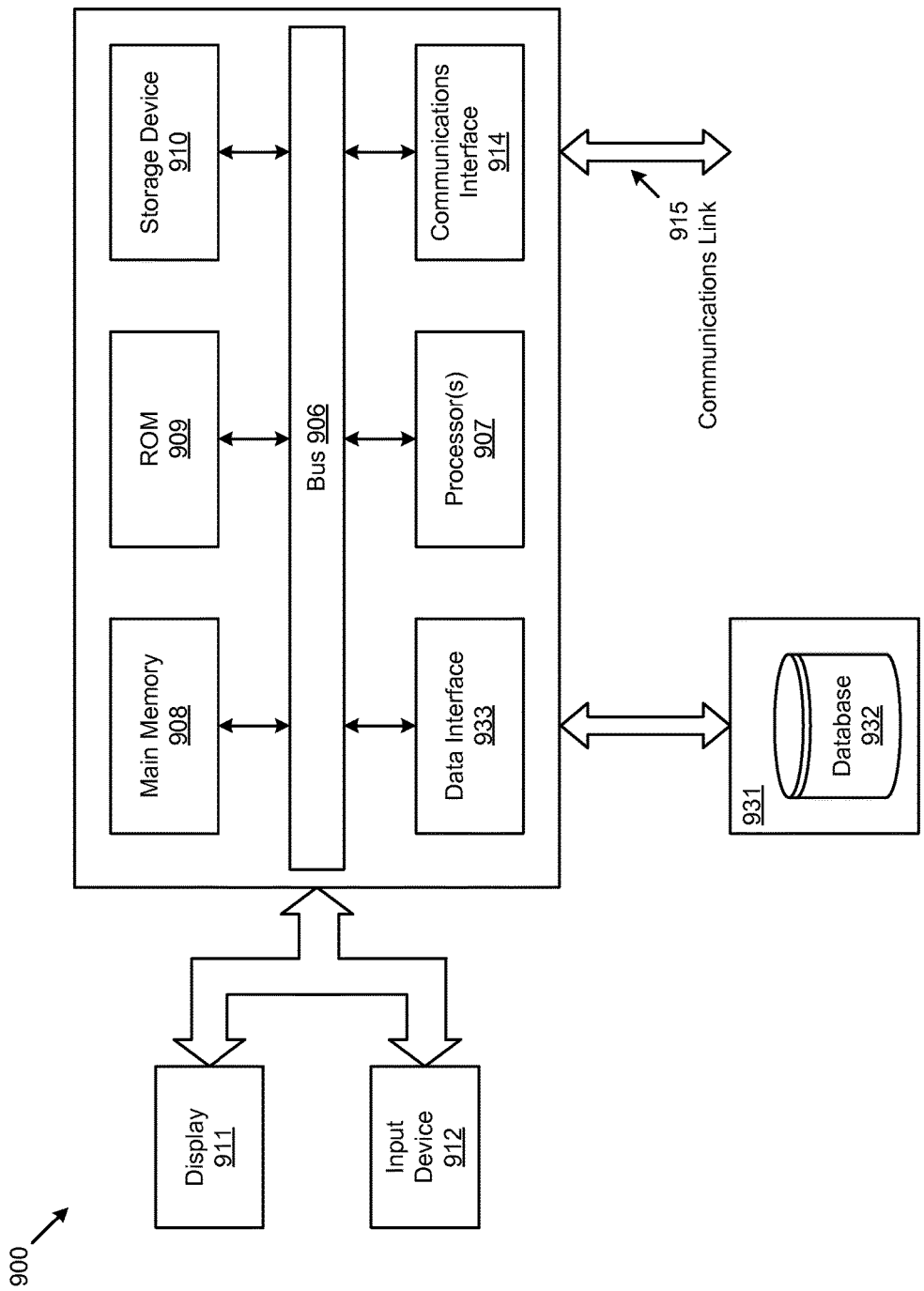
FIG. 9 depicts a block diagram of an instance of a computer system suitable for implementing an embodiment of the present disclosure.

FIG. 9 depicts a block diagram of an instance of a computer system 900 suitable for implementing an embodiment of the present disclosure. Computer system 900 includes a bus 906 or other communication mechanism for communicating information, which interconnects subsystems and devices, such as a processor 907, a system memory 908 (e.g., RAM), a static storage device (e.g., ROM 909), a disk drive 910 (e.g., magnetic or optical), a data interface 933, a communication interface 914 (e.g., modem or Ethernet card), a display 911 (e.g., CRT or LCD), input devices 912 (e.g., keyboard, cursor control), and an external data repository 931.

According to one embodiment of the disclosure, computer system 900 performs specific operations by processor 907 executing one or more sequences of one or more instructions contained in system memory 908. Such instructions may be read into system memory 908 from another computer readable/usable medium, such as a static storage device or a disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 900. According to certain embodiments of the disclosure, two or more computer systems 900 coupled by a communications link 915 (e.g., LAN, PTSN, or wireless network) may perform the sequence of instructions required to practice the disclosure in coordination with one another.

Computer system 900 may transmit and receive messages, data, and instructions, including programs (e.g., application code), through communications link 915 and communication interface 914. Received program code may be executed by processor 907 as it is received, and/or stored in disk drive 910 or other non-volatile storage for later execution. Computer system 900 may communicate through a data interface 933 to a database 932 on an external data repository 931. A module as used herein can be implemented using any mix of any portions of the system memory 908, and any extent of hard-wired circuitry including hard-wired circuitry embodied as a processor 907.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for generating database cluster health alerts using machine learning, the method comprising:
measuring a first database cluster for generating a baseline model identifying normal behavior for the first database cluster comprising a first plurality of nodes that communicate with at least one shared resource by:
collecting and filtering, at a first data collector coupled to at least a first microprocessor, a first set of variables from the first database cluster into a first filtered set by taking empirically-captured measurements of the first database cluster while the first database cluster is running a representative workload;
processing the first filtered set of variables from the first database cluster into time sequenced data sets corresponding to the first database cluster;
determining whether the time sequenced data sets corresponds to at least one of normal behavior or non-normal behavior; and
generating the baseline model based at least on the time sequenced data sets, wherein the baseline model corresponds to at least one of the normal behavior or the non-normal behavior; and
analyzing a second database cluster under observation, the second database cluster comprises a second plurality of nodes, the plurality of nodes communicating with at least one resource that is shared over a communication network, each of the first database cluster and the second database cluster corresponding to a database, the second database cluster analyzed by:
collecting and filtering, at a second data collector coupled to at least a second microprocessor, a second set of variables from the second database cluster into a second filtered set by obtaining a plurality of discrete event measurements from an operation of the second database cluster for comparison against the baseline model;
performing, at a semantic tagging engine coupled to at least the second microprocessor, a semantic analysis to map semantic meaning onto a plurality of discrete event measurements of the second database cluster to generate a plurality of tagged discrete event measurements, wherein the semantic meaning is mapped onto the plurality of discrete event measurements to identify a state of a process when accessing or waiting for access to the at least one shared resource within the second database cluster;
transforming, at a significance engine coupled to at least the second microprocessor, the plurality of tagged discrete event measurements into a sequence of semantically tagged state signals at least by deriving a plurality of compound values from the plurality of tagged discrete event measurements, wherein the plurality of compound values comprises a continuous sequence of vectorized values over a period of time and further indicates significance of operations of the second database cluster;
reducing, at a signal selection engine coupled to at least the second microprocessor, the sequence of semantically tagged state signals into a fewer number of semantically tagged state signals based at least in part upon the significance pertaining to the sequence of semantically tagged state signals;
analyzing the second set of variables pertaining to the fewer number of semantically tagged state signals at least by comparing the second set of variables with the baseline model to perform classification of behavior of the second database cluster as at least one of the normal behavior or the non-normal behavior; and
generating a database cluster health alert based at least in part on the classification.

2. The method of claim 1, further comprising reporting the database cluster health alert when the classification is anomalous behavior or fault behavior.

3. The method of claim 1, further comprising:
employing a baseline model generator for generating the baseline model;
employing an observed model generator for generating an observed behavior model, the observed behavior model corresponding to observations of the at least one shared resource taken from the second database cluster; and
receiving outputs from the baseline model generator to generate an observed behavior model.

4. The method of claim 1, further comprising:
performing observations on both known-good and known-faulty systems corresponding to the second database cluster;
from the observations of the known-good and known-faulty systems, identifying a plurality of sequences of state observations pertaining to a series of transitions from different database states for the second database cluster;
identifying at least two sequences from among the plurality of sequences of state observations to calculate a Bayesian belief network;
determining a likelihood of an occurrence of at least one of a fault state, normal state, or anomalous state within the second database cluster by accessing the Bayesian belief network;
identifying a given state for the second database cluster; and
from the given state for the second database cluster, identifying a normal state or a fault state for the second database cluster reachable from the given state along with one or more probabilities for reaching the normal state, the anomalous state, or the fault state in the database cluster.

5. The method of claim 4, further comprising
arranging concurrent faults generated by fault detectors in the Bayesian belief network to determine a root cause of an active anomalous state.

6. The method of claim 1, further comprising
filtering noise and redundant data from the plurality of discrete event measurements;
generating a continuous signal to format a set of time-stamped events into a time series;
formatting the sequence of semantically tagged state signals into a time series, wherein a time series entry comprises a time indication and a plurality of values, at least one of the plurality of values corresponding to a value generated for a related set of semantic tags for multiple sessions in the second database cluster; and processing the time series to identify candidate data sets for alert generation or fault detection.

7. A computer system for generating database cluster health alerts using machine learning, comprising:

a computer processor to execute a set of program code instructions; and a memory to hold the program code instructions, in which the program code instructions comprises program code which, when executed by the computer processor, causes the computer processor to perform:

measuring a first database cluster for generating a baseline model identifying normal behavior for the first database cluster comprising a first plurality of nodes that communicate with at least one shared resource by:

collecting and filtering, at a first data collector coupled to at least a first microprocessor, a first set of variables from the first database cluster by taking empirically-captured measurements of the first database cluster into a first filtered set while the first database cluster is running a representative workload;

processing the first filtered set of variables from the first database cluster into time sequenced data sets corresponding to the first database cluster;

determining whether the time sequenced data sets corresponds to at least one of normal behavior or non-normal behavior; and generating the baseline model based at least on the time sequenced data sets, wherein the baseline model corresponds to at least one of the normal behavior or the non-normal behavior; and analyzing a second database cluster under observation, the second database cluster comprises a second plurality of nodes, the plurality of nodes communicating with at least one resource that is shared over a communication network, each of the first database cluster and the second database cluster corresponding to a database, the second database cluster analyzed by:

collecting and filtering, at a second data collector coupled to at least a second microprocessor, a second set of variables from the second database cluster into a second filtered set by obtaining a plurality of discrete event measurements from an operation of the second database cluster for comparison against the baseline model;

performing, at a semantic tagging engine coupled to at least the second microprocessor, a semantic analysis to map semantic meaning onto a plurality of discrete event measurements of the second database cluster to generate a plurality of tagged discrete event measurements, wherein the semantic meaning is mapped onto the plurality of discrete event measurements to identify a state of a process when accessing or waiting for access to the at least one shared resource within the second database cluster;

transforming, at a significance engine coupled to at least the second microprocessor, the plurality of tagged discrete event measurements into a sequence of semantically tagged state signals at least by deriving a plurality of compound values from the plurality of tagged discrete event measurements, wherein the plurality of compound values comprises a continuous sequence of vectorized values over a period of time and further indicates significance of operations of the second database cluster;

reducing, at a signal selection engine coupled to at least the second microprocessor, the sequence of semantically tagged state signals into a fewer number of semantically tagged state signals based at least in part upon the significance pertaining to the sequence of semantically tagged state signals;

analyzing the second set of variables pertaining to the fewer number of semantically tagged state signals at least by comparing the second set of variables with the baseline model to perform classification of behavior of the second database cluster as at least one of the normal behavior or the non-normal behavior; and generating a database cluster health alert based at least in part on the classification.

8. The computer system of claim 7, wherein the program code, when executed by the computer processor, further causes the computer processor to perform reporting the database cluster health alert when the classification is anomalous behavior or fault behavior.

9. The computer system of claim 7, wherein the program code, when executed by the computer processor, further causes the computer processor to perform:

employing a baseline model generator for generating the baseline model;

employing an observed model generator for generating an observed behavior model, the observed behavior model corresponding to observations of the at least one shared resource taken from the second database cluster; and receiving outputs from the baseline model generator to generate an observed behavior model.

10. The computer system of claim 7, wherein the program code, when executed by the computer processor, further causes the computer processor to perform:

performing observations on both known-good and known-faulty systems corresponding to the second database cluster;

from the observations of the known-good and known-faulty systems, identifying a plurality of sequences of state observations pertaining to a series of transitions from different database states for the second database cluster;

identifying at least two sequences from among the plurality of sequences of state observations to calculate a Bayesian belief network;

determining a likelihood of an occurrence of at least one of a fault state, normal state, or anomalous state within the second database cluster by accessing the Bayesian belief network;

identifying a given state for the second database cluster; and from the given state for the second database cluster, identifying a normal state or a fault state for the second database cluster reachable from the given state along with one or more probabilities for reaching the normal state or the fault state in the second database cluster.

11. The computer system of claim 10, wherein the program code, when executed by the computer processor, further causes the computer processor to perform:

arranging concurrent faults generated by fault detectors in the Bayesian belief network to determine a root cause of an active anomalous state.

12. The computer system of claim 7, wherein the program code, when executed by the computer processor, further causes the computer processor to perform:

filtering noise and redundant data from the plurality of discrete event measurements;

generating a continuous signal to format a set of time-stamped events into a time series;

formatting the sequence of semantically tagged state signals into a time series, wherein a time series entry comprises a time indication and a plurality of values, at least one of the plurality of values corresponding to a value generated for a related set of semantic tags for multiple sessions in the second database cluster; and processing the time series to identify candidate data sets for alert generation or fault detection.

13. A computer program product embodied in a non-transitory computer readable medium, the non-transitory computer readable medium having stored thereon a sequence of instructions which, when executed by a processor causes the processor to execute a set of acts to implement generating database cluster health alerts using machine learning, the set of acts comprising:

measuring a first database cluster for generating a baseline model identifying normal behavior for the first database cluster comprising a first plurality of nodes that communicate with at least one shared resource by:

collecting and filtering, at a first data collector coupled to at least a first microprocessor, a first set of variables from the first database cluster into a first filtered set by taking empirically-captured measurements of the first database cluster while the first database cluster is running a representative workload;

processing the first filtered set of variables from the first database cluster into time sequenced data sets corresponding to the first database cluster;

determining whether the time sequenced data sets corresponds to at least one of normal behavior or non-normal behavior; and generating the baseline model based at least on the time sequenced data sets, wherein the baseline model corresponds to at least one of the normal behavior or the non-normal behavior; and analyzing a second database cluster under observation, the second database cluster comprises a second plurality of nodes, the plurality of nodes communicating with at least one resource that is shared over a communication network, each of the first database cluster and the second database cluster corresponding to a database, the second database cluster analyzed by:

collecting and filtering, at a second data collector coupled to at least a second microprocessor, a second set of variables from the second database cluster into a second filtered set by obtaining a plurality of discrete event measurements from an operation of the second database cluster for comparison against the baseline model;

performing, at a semantic tagging engine coupled to at least the second microprocessor, a semantic analysis to map semantic meaning onto a plurality of discrete event measurements of the second database cluster to generate a plurality of tagged discrete event measurements, wherein the semantic meaning is mapped onto the plurality of discrete event measurements to identify a state of a process when accessing or waiting for access to the at least one shared resource within the second database cluster;

transforming, at a significance engine coupled to at least the second microprocessor, the plurality of tagged discrete event measurements into a sequence of semantically tagged state signals at least by deriving a plurality of compound values from the plurality of tagged discrete event measurements, wherein the plurality of compound values comprises a continuous sequence of vectorized values over a period of time and further indicates significance of operations of the second database cluster;

reducing, at a signal selection engine coupled to at least the second microprocessor, the sequence of semantically tagged state signals into a fewer number of semantically tagged state signals based at least in part upon the significance pertaining to the sequence of semantically tagged state signals;

analyzing the second set of variables pertaining to the fewer number of semantically tagged state signals at least by comparing the second set of variables with the baseline model to perform classification of behavior of the second database cluster as at least one of the normal behavior or the non-normal behavior; and generating a database cluster health alert based at least in part on the classification.

14. The computer program product of claim 13, wherein the sequence of instructions which, when executed by the processor causes the processor to execute the set of acts, the set of acts further comprising reporting the second database cluster health alert when the classification is anomalous behavior or fault behavior.

15. The computer program product of claim 13, wherein the sequence of instructions which, when executed by the processor causes the processor to execute the set of acts, the set of acts further comprising:

employing a baseline model generator for generating the baseline model;

employing an observed model generator for generating an observed behavior model, the observed behavior model corresponding to observations of the at least one shared resource taken from the second database cluster; and receiving outputs from the baseline model generator to generate an observed behavior model.

16. The computer program product of claim 13, wherein the sequence of instructions which, when executed by the processor causes the processor to execute the set of acts, the set of acts further comprising:

performing observations on both known-good and known-faulty systems corresponding to the second database cluster;

from the observations of the known-good and known-faulty systems, identifying a plurality of sequences of state observations pertaining to a series of transitions from different database states for the second database cluster;

identifying at least two sequences from among the plurality of sequences of state observations to calculate a Bayesian belief network; and determining a likelihood of an occurrence of at least one of a fault state, normal state, or anomalous state within the second database cluster by accessing the Bayesian belief network;

identifying a given state for the second database cluster; and from the given state for the second database cluster, identifying a normal state or a fault state for the second database cluster reachable from the given state along with one or more probabilities for reaching the normal state or the fault state in the second database cluster.

17. The computer program product of claim 16, wherein the sequence of instructions which, when executed by the processor causes the processor to execute the set of acts, the set of acts further comprising arranging concurrent faults generated by fault detectors in the Bayesian belief network to determine a root cause of an active anomalous state.

* * * * *